United States Patent [19]
Linville

[11] 3,812,272

[45] May 21, 1974

[54] PREPARATION OF AN ADDITIVE FOR ALCOHOLIC BEVERAGES

[76] Inventor: Creath Q. Linville, 3601 N. Fifth Ave., Apt. 110, Phoenix, Ariz. 85013

[22] Filed: Sept. 1, 1972

[21] Appl. No.: 176,841

[52] U.S. Cl. .............................. 426/380, 426/192
[51] Int. Cl. ............................................ C12g 3/06
[58] Field of Search ................ 99/30, 34, 146, 147; 426/11, 17, 192, 221

[56] References Cited
FOREIGN PATENTS OR APPLICATIONS
89    1854    Great Britain ...................... 99/147
1,942    1870    Great Britain ........................ 99/34

OTHER PUBLICATIONS

Lord, I. E., Everybody's Cook Book, Henry Holt and Company, NY., 1924 (p. 563), TX 715 L86.

*Primary Examiner*—David M. Naff
*Attorney, Agent, or Firm*—H. Gordon Shields

[57] ABSTRACT

An additive for alcoholic beverages is prepared by blending at room temperature about equal volumes of honey and vinegar, and diluting the blend with water.

2 Claims, 3 Drawing Figures

PATENTED MAY 21 1974  3,812,272

[HONEY (SUGAR)] + [VINEGAR (ACETIC ACID)] + [WATER]

Fig-1

STEP 1.
ADD EQUAL VOLUMES OF HONEY AND VINEGAR

STEP 2.
AGITATE SOLUTION FOR 30 MINUTES

STEP 3.
LET SOLUTION BLEND FOR 2 TO 3 HOURS

STEP 4.
DILUTE SOLUTION WITH DISTILLED WATER

Fig-2

STEP 1.
ADD EQUAL VOLUMES OF HONEY AND VINEGAR

STEP 2.
LET SOLUTION BLEND AT ROOM TEMPERATURE

STEP 3.
DILUTE SOLUTION WITH DISTILLED WATER

Fig-3

INVENTOR
CREATH Q. LINVILLE
BY
H. Gordon Shields
ATTORNEY

PREPARATION OF AN ADDITIVE FOR ALCOHOLIC BEVERAGES

BACKGROUND OF THE INVENTION

1. Field of the Invention

This invention relates to an additive for beverages, and, more particularly, to an additive for alcoholic beverages in which "sweet and sour" characteristics are desired.

2. Description of the Prior Art

A "sweet and sour" additive is sometimes desirable for use with certain kinds of alcoholic beverages, such as tequila. Sweet and sour additives in the prior art usually comprise a citrus base, such as lemon, grapefruit, or lime, and sugar blended together in a water solution. With tequila, however, such sweet and sour additive does not substantially reduce the bitterness or unpleasantness of the basic tequila taste.

Some alcoholic beverages, such as gin and vodka, have little or no intrinsic taste, and accordingly must be blended with some other ingredient to provide a pleasant tasting beverage solution. In some cases another alcoholic beverage is used, or, in other cases another additive, such as a citrus juice, tomato juice, or the like, is added. Moreover, there are many bottled mixers which one may purchase from food stores or beverage stores which are special blends of a number of ingredients, for use with various types of alcoholic beverages. These mixers provide either a taste base for an alcoholic beverage, such as vodka or gin, or else a pleasant tasting additive which can be used with other alcoholic beverages, such as various kinds of whiskeys, rum, or tequila, which do have intrinsic tastes of their own.

Some alcoholic beverages, such as whiskeys, have very distinctive tastes and leave a distinctive odor in the imbiber's mouth. Often times, and to many people, such odor is offensive and distasteful. Accordingly, it is advantageous to be able to add to the basic alcoholic beverage, such as whiskey, an additive or a solution which will relieve or nullify the basic or inherent whiskey taste on one's breath and in one's mouth. The so-called "alcoholic breath" is often distasteful to clients and associates of business or professional people or even to non-drinking spouses. To overcome this so-called "alcoholic breath" many drinking persons will resort to an alcoholic beverage such as vodka, when they would prefer to drink whiskey. With the use of an additive which could nullify or relieve the alcoholic breath, imbibers could continue to enjoy the type of alcoholic beverage which they would prefer.

Few, if any, alcoholic beverages have any food value. Various additives, such as the sweet and sour additive discussed above in conjunction with tequila, and some mixers, include sugar which provides at least a small amount of calories. However, the calories are empty or void of any food value other than the calories themselves. The amount of citrus which is used in such additives is so slight as to have little food value.

The present invention offers solutions to the problems of the prior art and to the "alcoholic breath." The additive also provides a solution to the problems discussed above regarding additives for alcoholic beverages.

SUMMARY OF THE INVENTION

This invention comprises an additive of honey and vinegar, of the apple cider type, blended together for use with various kinds of beverages, including alcoholic beverages. The additive includes a substantial amount of honey, with its natural nutrients and food value and its preservative ability, and an acetic acid based ingredient, such as pure apple cider vinegar. The blend comprises a sweet and sour solution which may be used with tequila, whiskey, or virtually any other alcoholic beverage. The solution may also be used, if desired, with many fruit juices. When added to an alcoholic beverage, such as whiskey or tequila, the additive removes or relieves the alcoholic breath of the imbiber. The honey in the additive provides some food value to the alcoholic beverage.

Among the objects of the present invention are the following:

to provide a new and useful additive for a beverage;

to provide a new and useful additive for an alcoholic beverage;

to provide a new and useful additive for an alcoholic beverage which relieves alcoholic breath;

to provide a new and useful additive for an alcoholic beverage which includes food value;

to provide a new and useful additive for fruit juices;

to provide a new and useful vinegar and honey solution;

to provide a new and useful sweet and sour additive for alcoholic beverages;

to provide a new and useful method for preparing an additive for a beverage; and to provide a new and useful method for preparing an additive for an alcoholic beverage.

BRIEF DESCRIPTION OF THE DRAWING

FIG. 1 discloses the ingredients of the additive.

FIG. 2 is a chart reciting steps in a preferred method for preparing the additive.

FIG. 3 is a chart reciting steps for preparing the additive in an alternate embodiment.

DESCRIPTION OF THE PREFERRED EMBODIMENT

The primary ingredients of the additive, as shown in FIG. 1, are honey and vinegar. The honey comprises the "sweet" portion of the additive, and is primarily sugar, while the vinegar comprises the "sour" portion of the mixture and the primary ingredient is acetic acid. Both honey and vinegar are well known products and have been used individually and together for innumerable years. However, they have not been used heretofore in the manner and for the purpose as disclosed in the present invention.

Honey is a composition, primarily a sweet, viscous liquid, made by honeybees from nectar produced by flowers on plants. The nectar is collected by the honeybees and transported to hives. Within the hives the honey is ripened and is stored in honeycomb cells. While the primary purpose of the honeybee in making and storing honey is to later use the honey as a food, commercial beekeeping produces more honey than is required by the bees and the excess amount of honey is removed from the hives and is used for human consumption.

Honeys vary in composition according to the floral source of the nectars from which the honeybees manufacture the honey, and according to varying environmental conditions. Chemically speaking, honey is a solution of two primary sugars, fructose or levulose, also commonly known as fruit sugar, and dextrose or glucose, sometimes termed grape sugar. Honey also often includes small amounts of sucrose, which is sometimes referred to as cane or beet sugar. The water content of honey varies between about 13 and 20 percent, and the fructose or fruit sugar varies between about 40 and 50 percent, and the dextrose or grape sugar varies between about 32 and 37 percent, and the sucrose or cane sugar is usually about 2 percent. The other ingredients or components of honey, which comprise about 10 to 13 percent, include small amounts of maltose, dextrin, gums, enzymes, numerous vitamins, and various kinds of suspended pollens. Both fructose and dextrose have the chemical formula $C_6H_{12}O_6$. However, there are differences between the two sugars. The chemical formula for fructose or fruit sugar may also be written $C_5H_{12}O_5{:}CO$, and the chemical formula for the dextrose or grape sugar may be written $C_5H_{11}O_5{\cdot}CHO$. The sucrose, more often termed cane or beet sugar, is a more complex sugar than both the fructose or dextrose, and its chemical formula may be expressed as $C_{12}H_{22}O_{11}$. Honey is slightly heavier than water, and its specific gravity varies between about 1.45 and 1.49, at about 20 degrees centigrade.

Like honey, vinegar is an old, well known product, whose origin disappears into antiquity. Vinegar is made by the alcoholic and acetic fermentation of sugary liquids, such as various types of fruit juices or diluted alcoholic solutions. In the United States there are two principal types of vinegars, cider vinegar made from apple cider, and distilled vinegar, produced by the acetic fermentation of diluted alcohol solutions. Other countries make vinegar out of different materials, such as grape juice, orange juice, pineapple juice, honey, malt liquors, or even dilute solutions of acetic acid.

Chemically speaking, vinegar is a dilute solution of acetic acid and other materials, such as salts and organic matter from the source solution or material from which the vinegar was made. The production of vinegar includes two distinct steps. The first step is the fermentation of sugar into alcohol, and the second is the acetic fermentation of alcohol into acetic acid and water. Both steps require living organisms, such as the bacteria of yeast and the vinegar organism or bacteria. In the first step referred to above, sugar and yeast are combined to produce by the fermentation process of the action of yeast bacteria and the sugar alcohol and carbon dioxide. In the second step, alcohol and oxygen are combined with a vinegar producing organism and through fermentation, acetic acid and water are produced. Typically, vinegar has a minimum of about 4 percent of acetic acid. In cider vinegar, the specific gravity varies between about 1.013 to 1.014, and the acetic acid content is about 4.84 percent. With distilled vinegar, the specific gravity is generally lower, ranging from about 1.008 to about 1.013, and the acetic acid content is higher than cider vinegar, or about 6.34 percent.

The beverage additive, in addition to honey and vinegar, also includes a substantial amount of water to reduce the viscosity of the honey and vinegar solution.

FIG. 2 discloses a method for making the additive, and it comprises four steps. The first step in making the additive includes the addition of equal volumes of honey and vinegar. Preferably, the vinegar used in the additive comprises pure apple cider vinegar, which, as discussed above, has a slightly different chemical composition from distilled vinegar. There is also a difference between cider vinegar and distilled vinegar with respect to the taste and odor of each of them. While it has been found that a solution of equal volumes of honey and vinegar is preferable under certain circumstances, the volumes of honey and vinegar may be varied as desired to suit the tastes of various individuals and according to the beverage to which it is added.

The second step in the preparation of the additive is to agitate the honey and vinegar solution for about thirty minutes. While vinegar and honey, if mixed and allowed to sit, will blend of their own inherent natures, the blending takes a substantial amount of time, and accordingly, the agitation of the solution decreases the blending time. Once blended, the resulting solution is less viscous than the honey, and more viscous than the vinegar.

Step three in the preparation of the beverage additive comprises letting the agitated solution blend for two to three hours. While the agitation greatly increases the blending of the honey and the vinegar, it does not completely cause the solution to blend. Accordingly, it is necessary to let the solution blend, without agitation, for two to three hours to complete the blending process. It will be noted that when the honey and the vinegar are mixed, blending begins immediately and no separation takes place at ordinary room temperature. Accordingly, once the solution has completed its blending, or, in other words, when there is a complete mixing of the honey and the vinegar, under ordinary circumstances at room temperature, there is no separation of the honey and the vinegar.

The fourth and final step in the preparation of the beverage additive is the dilution of the blended solution with water. Preferably distilled water is added to the blended honey and vinegar to decrease further the viscosity of the solution and also to simply dilute the solution as to the strength of both the acetic acid of the vinegar and the honey in the solution. It has been determined that a 50 percent dilution is preferred under normal circumstances. However, the extent of the dilution is not critical and may vary according to the beverage, the user, and other desiderata.

While ordinary tap water may be used for the dilution, distilled water or deionized water is preferable from the standpoint of taste and also from the standpoint of the mineral or salt content normally found in tap water. The honey and vinegar solution is completely miscible with the water and, again, no separation will occur with respect to the diluted solution of honey, vinegar, and water.

While both honey and vinegar are substantially impervious to spoilage on the shelf. Stated another way, they have very long, if not almost infinite, shelf lives. The final solution retains those qualities. Neither honey nor vinegar requires refrigeration and similarly the beverage additive requires no refrigeration and thus may be prepared and left at room temperature as long as desired, or until the solution is used up in the normal course of events.

As previously indicated, the beverage additive comprises a sweet and sour additive for alcoholic beverages. Virtually any kind of alcoholic beverage will blend with the additive. Accordingly, tequila, gin, vodka, rum, whiskeys of all types, and all wines may be mixed and served with the additive. Moreover, most fruit juices, with the exclusion of citrus juices or those which contain citric acid, will also blend and mix with the additive. Cranberry, apple, prune, and any berry juices may be mixed with the additive to provide a pleasant tasting, refreshing mixture or beverage.

FIG. 3 comprises an alternate method of preparing the additive. Step one is substantially the same as step one of the method of FIG. 2, and it comprises the adding of equal volumes of honey and vinegar. Step 2 comprises the step of letting the honey and vinegar solution blend at room temperature. If time is not of the essence, the honey and vinegar solutions will blend in and of themselves, without the agitation as called for in step two of the method of FIG. 2. If the solution is allowed to blend at room temperature, such blending will require several days, as many as four or five. Again, as discussed in conjunction with FIG. 2, once a complete blending has occurred, no separation of the honey or vinegar will normally take place.

Step three is substantially the same as step four of FIG. 2, and it comprises the step of diluting, by about 50 percent, the blended solution with distilled or deionized (demineralized) water. The addition of the water reduces the viscosity of the blended solution and yet still retains the full flavor of the honey and vinegar mixture or solution.

Thus an additive has been disclosed which may be used with virtually any alcoholic beverage and with virtually any fruit juice which does not include citric acid. The effect of the additive in beverages is to provide a sweet and sour mixture. When used with alcoholic beverages, the additive substantially eliminates the alcoholic breath which results from imbiding most alcoholic beverages, and at the same time produces a pleasant tasting mixture for the alcoholic beverage. The additive also eliminates the unpleasant taste of tequila and furnishes a sweet and sour mixture for the tequila. Moreover, the use of honey as an additive for alcoholic beverages provides food value for the combination beverage.

While a preferred embodiment of the beverage additive has been disclosed, it is obvious that other types of vinegars could be used, and that the mixture of vinegar and honey could be in other proportions than herein disclosed, and that the addition of water to dilute the mixture and to reduce the viscosity of the mixture could be changed without departing from the inventive principles herein embodied. The appended claims are therefore intended to cover and embrace any such modifications or changes, within the limits only of the true spirit and scope of the invention. This specification and the appended claims have been prepared in accordance with the applicable patent laws and the rules promulgated under the authority thereof.

What is claimed is:

1. A process for preparing an additive for an alcoholic beverage, comprising the steps of:
    mixing about equal volumes of honey and vinegar;
    blending the honey and vinegar at room temperature to form a solution; and diluting the honey and vinegar solution with water.

2. The process of claim 1 in which the blending step includes agitating the honey and vinegar.

* * * * *